United States Patent Office 3,422,522
Patented Jan. 21, 1969

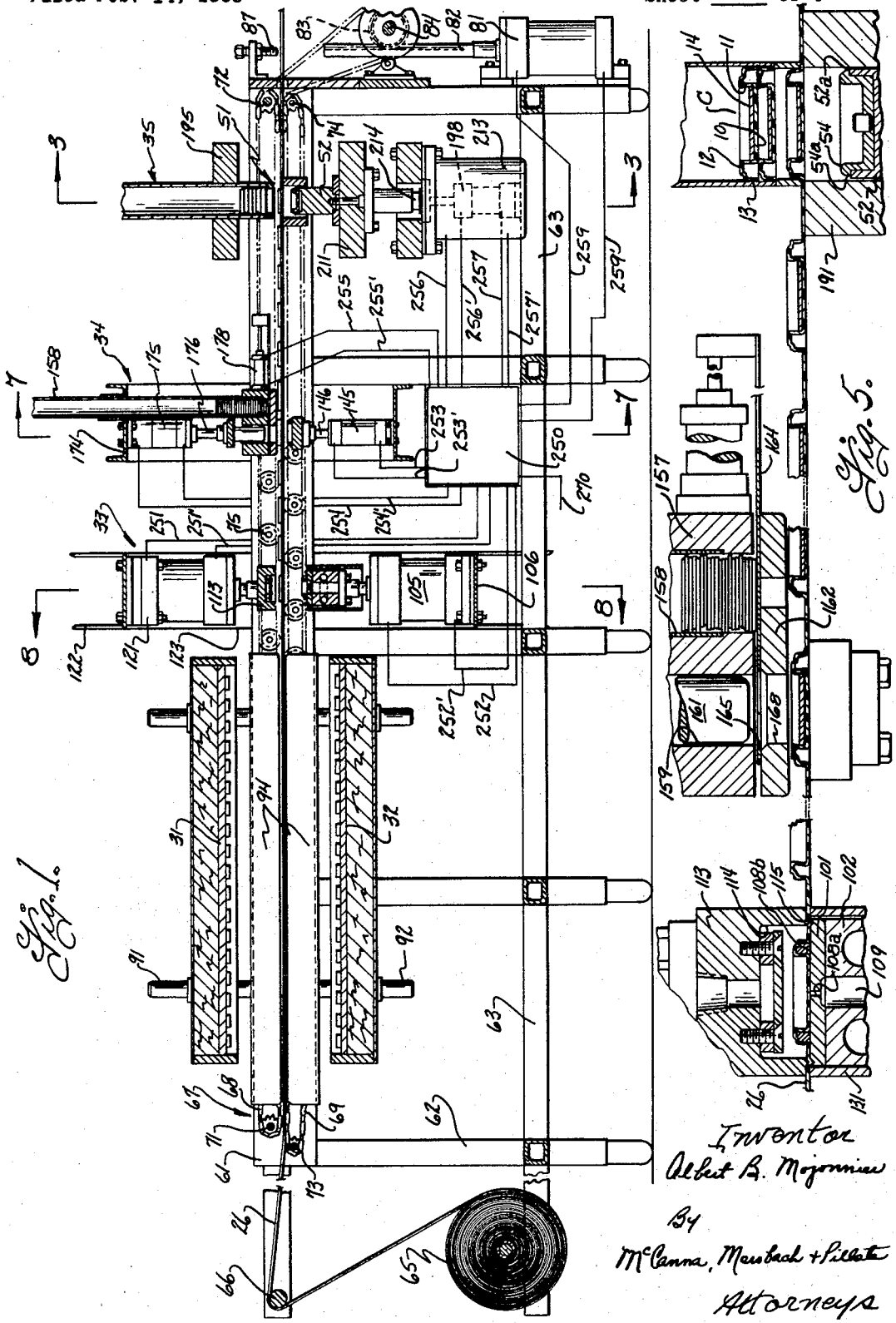

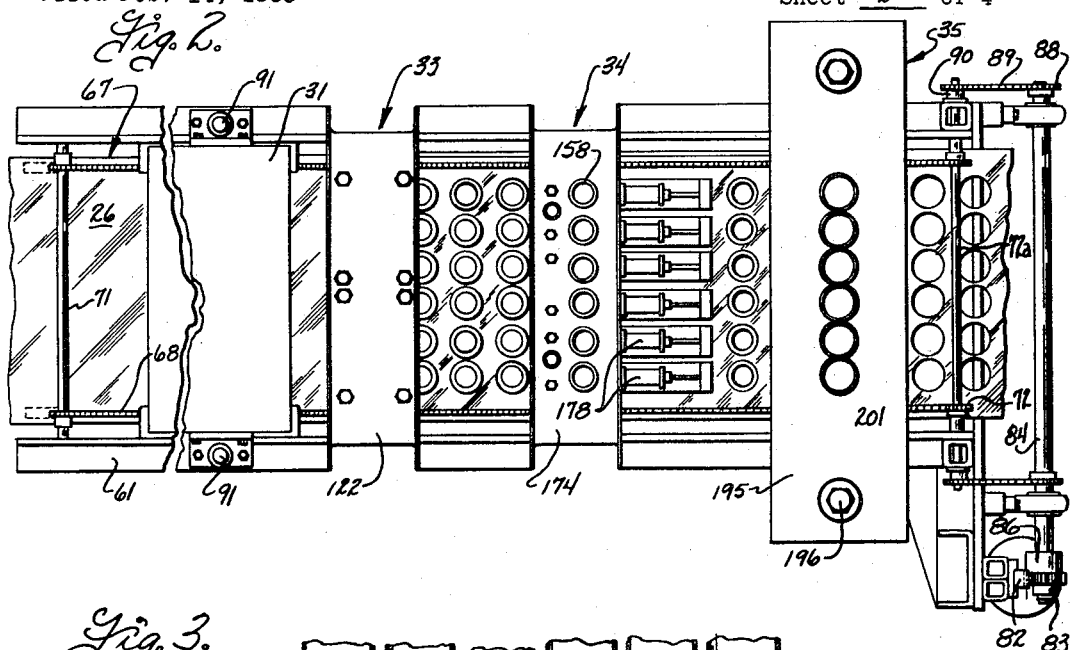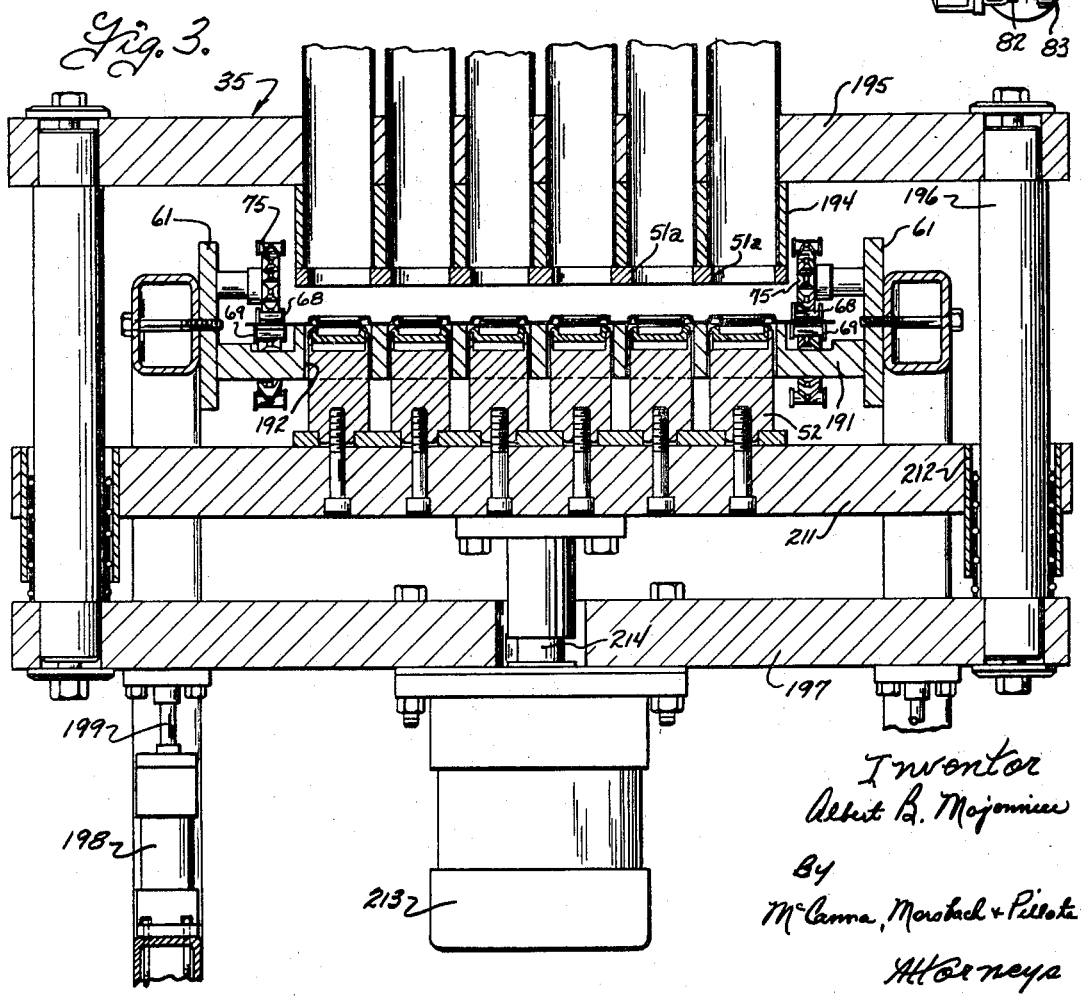

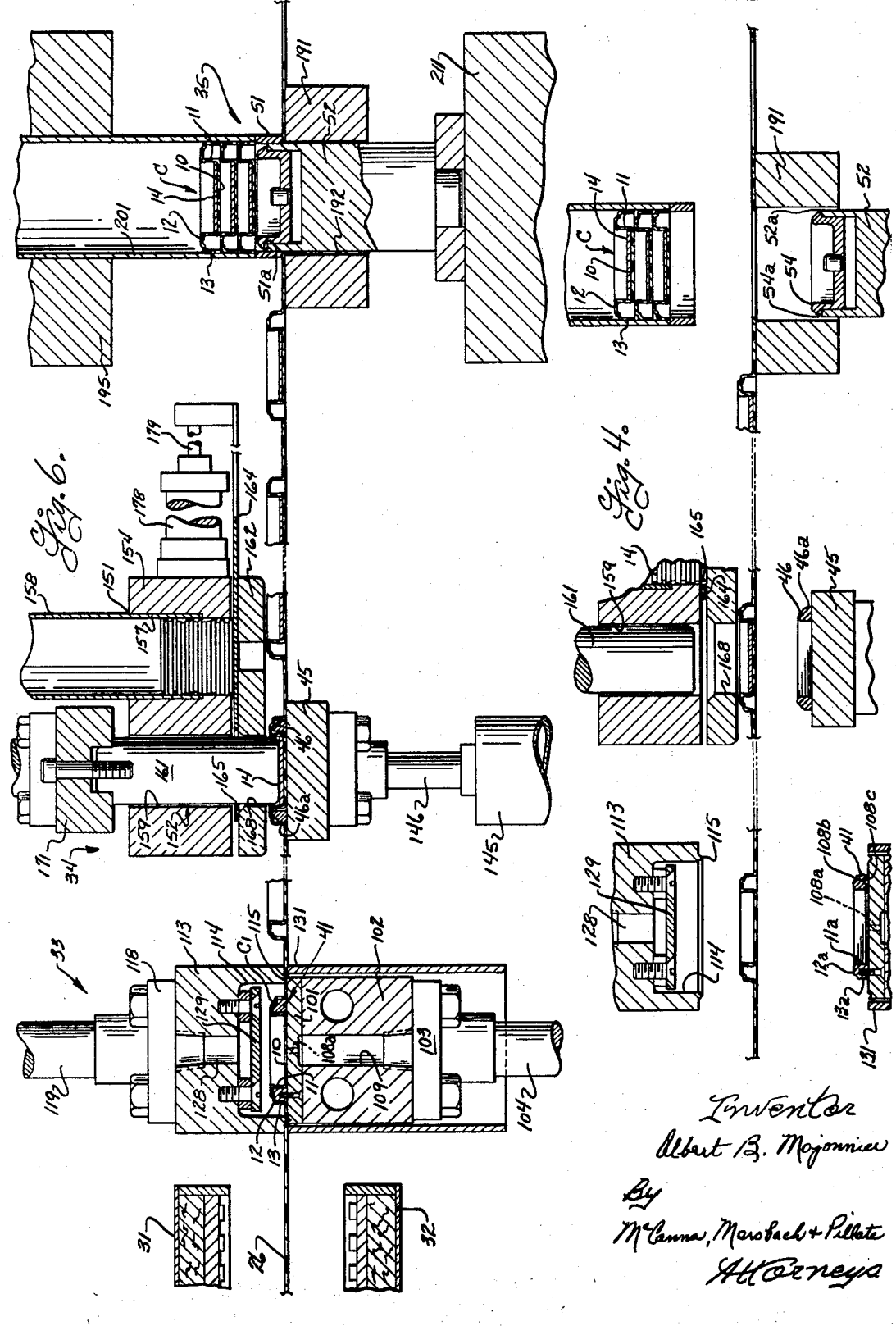

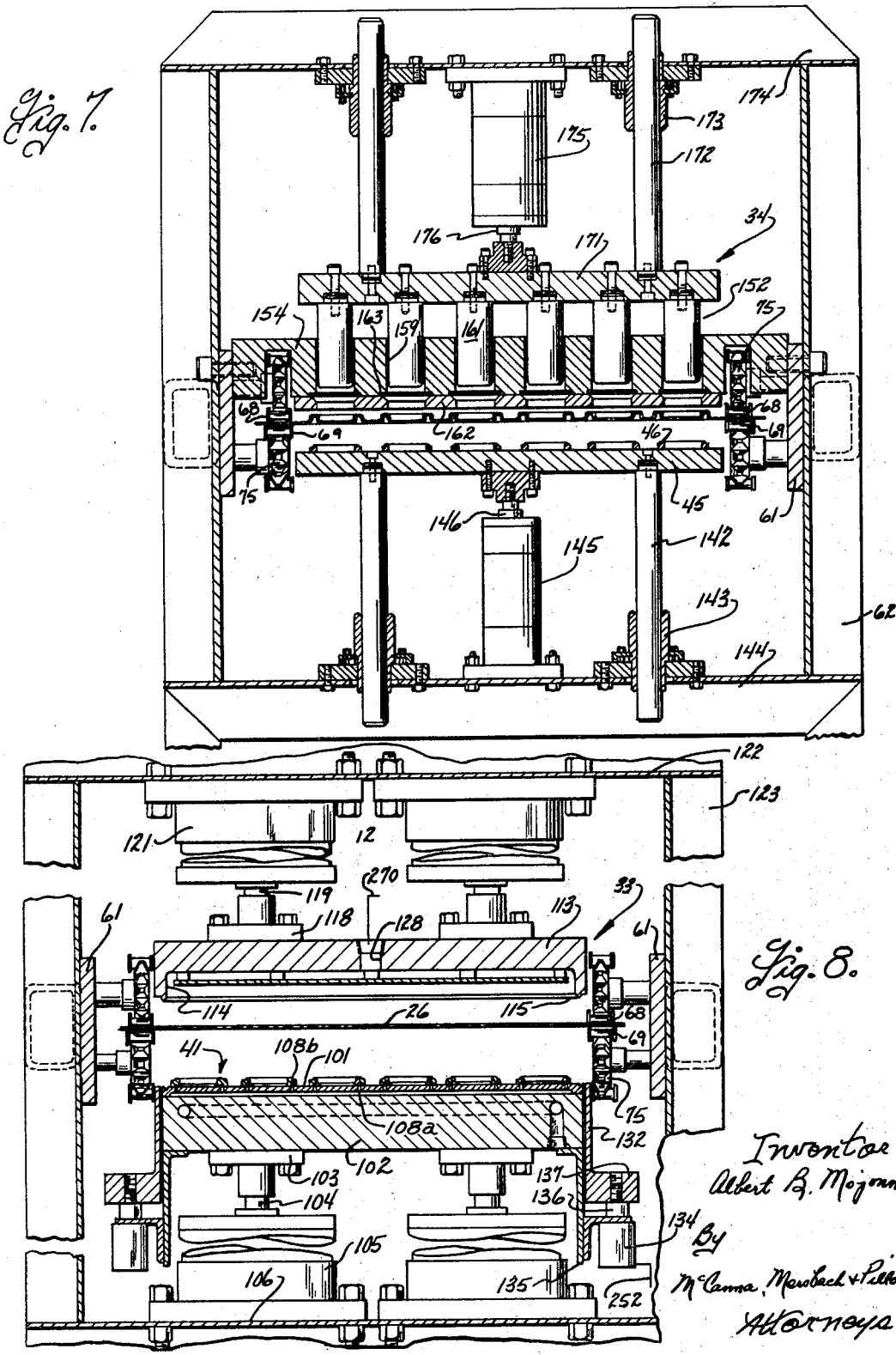

3,422,522
METHOD AND APPARATUS FOR MAKING CAPS
Albert B. Mojonnier, Chicago, Ill., assignor to Albert Mojonnier Inc., Franklin Park, Ill., a corporation of Illinois
Filed Feb. 14, 1966, Ser. No. 527,155
U.S. Cl. 29—412          5 Claims
Int. Cl. B23p *17/04;* B23p *23/04*

ABSTRACT OF THE DISCLOSURE

A method and apparatus for forming plastic caps with disk inserts in which the caps are thermoformed in the sheet of plastic material with a mouth-spanning portion, an upwardly and inwardly inclined annular sealing wall around the mouth-spanning portion, an outwardly extending rim on the upper end of the sealing wall, and a depending skirt on the outer edge of the rim having its lower end integrally joined with the sheet at a level adjacent the level of the mouth-spanning portion, a diametrically stiff disk is pressed into the annular sealing wall while the cap remains attached to the sheet, and the caps are thereafter severed from the sheet adjacent the juncture of the skirt and cap.

---

This invention relates to a method and apparatus for making caps and particularly to a method and apparatus for making plastic caps with disk inserts.

An important object of this invention is to provide a method and apparatus for making plastic caps with disk inserts, and which produces a cap having an annular sealing wall of improved dimensional accuracy.

Another object of this invention is to provide a method and apparatus for making plastic caps with disk inserts, and which avoids damage to the caps and inserts during assembly of the same.

A further object of this invention is to provide a method and apparatus for making plastic caps with disk inserts, and which enables rapid and economical production of such caps.

Yet another object of this invention is to provide an improved method and apparatus for forming plastic caps with disk inserts wherein the caps are thermo-formed in a sheet and advanced with the sheet past successive stations wherein the disks are inserted in the cap and the caps thereafter punched from the sheet so that the caps are completed with the disk assembled prior to separation of the caps from the sheet.

These, together with other objects and advantages of this invention, will be more readily understood by reference to the following detailed description, when taken in connection with the accompanying drawings wherein:

FIGURE 1 is a longitudinal sectional view through a cap making and forming apparatus suitable for practicing the method;

FIG. 2 is a plan view of the cap making and forming apparatus of FIG. 1;

FIG. 3 is a transverse sectional view through the cap making apparatus, taken on the plane 3—3 of FIG. 1 and illustrating the parts on a larger scale;

FIGS. 4–6 are diagrammatic views illustrating sequential steps in the thermo-forming, disk inserting and severing of the caps from the sheet of thermo-plastic material;

FIG. 7 is a transverse sectional view through the disk inserting station, taken on the plane 7—7 of FIG. 1; and FIG. 8 is a transverse sectional view through the cap forming station, taken on the plane 8—8 of FIG. 1.

The method and apparatus of the present invention is arranged to form caps of the types indicated at C in FIGS. 4–6 and which include a central mouth-spanning portion 10, an upwardly and inwardly inclined sealing wall 11 around the mouth-spanning portion, an outwardly extending rim 12 on the upper end of the sealing wall, and a depending skirt 13 which extends downwardly from the rim to a level adjacent the level of the mouth-spanning portion. The upwardly and inwardly inclined annular sealing wall 11 has its major diameter at or adjacent to the mouth-spanning portion and a minor diameter adjacent the upper end which is connected to the rim 12. A disk insert 14 is disposed in the annular sealing wall and overlies the mouth-spanning portion 10 of the cap. For reasons pointed out hereinafter, the cap C is preferably made of a thermo-plastic material and the disk insert 14 is preferably formed of fiber stock such as pressed paper which is sufficiently thick to be radially stiff and generally rigid.

Articles formed of thermo-plastic material are subject to considerably shrinkage on cooling, and even after the articles have cooled. Moreover, the shrinkage is not always uniform and varies dependent on a number of factors including initial stresses in the plastic sheet material from which the article is formed; the thickness of the different portions of the formed articles; the temperature at which it is formed; the temperature at which it leaves the forming dies etc. As a result, articles formed from such thermo-plastic material ordinarily do not have good dimensional accuracy.

In the forming of the caps from thermo-plastic material in accordance with the present invention, provision is made for controlling the dimensional accuracy of the annular sealing wall of the cap so as to assure substantial uniformity in the sealing wall and thus provide improved sealing when the cap is subsequently applied to a container spout.

The sequential steps in the forming of the plastic caps with the disk inserts is best shown in FIGS. 4–6. The cap may be formed from any suitable thermo-plastic material such as polyethylene, polystyrene, polypropylene, etc. The sheet material, designated generally by the numeral 26, must be heat softened before forming into the caps. It is apparent that the sheet may be formed to the caps while the sheet is still in a heat softened condition from the apparatus which initially produces a sheet or, as shown in the drawings, the sheet 26 may be heat softened by one or more radiant type heaters designated 31 and 32, of conventional construction. In order to reduce the over-all time required for heating and to provide more uniform heating of the sheet material, it is preferable to employ dual heaters on opposite sides of the sheet, as shown in the drawings.

The heat softened sheet is advanced sequentially past a cap forming station 33, a disk inserting station 34, and a cap severing station 35 where the completed caps are severed from the sheet. A cap forming die 41 is provided at the forming station 33 and the sheet is subjected to a fluid pressure differential at opposite sides which presses the heat softened sheet into conformity with the forming die. The cap shape designated c1 which is formed in the sheet at the cap forming station has a configuration corresponding to that of the completed cap and includes the heretofore described mouth-spanning portion 10, upwardly and inwardly inclined sealing wall 11, outwardly extending rim 12 and depending skirt 13. The lower edge of the depending skirt remains integral with the sheet at a level adjacent the level of the mouth-spanning portion 10.

The cap shapes c1 while still attached to the sheet and while in a warm somewhat soft condition, are advanced to the disk inserting station where the disks 14 are pressed into the annular sealing wall of the cap. The disks 14 are formed by punching the same from sheet stock to provide an accurately sized disk having an outer diameter dimensioned to be closely received in the major inner diameter of the annular sealing wall of the cap shape. The disks are preferably prepunched from sheet stock using conventional apparatus such as that employed in forming the fiber disks sometimes employed alone as milk bottle caps. Alternatievly, the disks could be punched from sheet stock and directly inserted into the plastic cap shapes, if desired. The disks are preferably formed from fiber stock such as cardboard or the like having sufficient thickness to be radially and substantially rigid. By employing a disk of fiber stock instead of plastic, improved dimensional accuracy is achieved, since it avoids the dimensional changes which occur in plastic even when cold. By inserting the disk in the cap shape before it is cold, the disk controls radial shrinkage or contraction of the annular wall and provides a cap having improved dimensional accuracy in its sealing wall. In addition, the cap shape is more pliable before it is completely cold and allows radial expansion of the upper end of the sealing wall for insertion of the disk. Since the cap shape $c1$ is joined to the heat softened sheet at a level adjacent the mouth-spanning portion, it will be seen that the sheet does not impede outward shifting movement of the upper portion of the annular sealing wall and rim. The cap shaped is preferably radially centered and supported during disk inserting and, as shown, includes a support member 45 having an annular centering member 46 thereon adapted to extend into the cap shape between the sealing wall and the skirt. As shown in FIG. 6, the annular member 46 has an outer wall 46a shaped to engage the inner side of the skirt to radially support and center the cap shape, and the annular member is spaced outwardly from the annular sealing wall, at least in the region adjacent the upper end of the sealing wall, to allow outward movement of the sealing wall during insertion of the disk.

The cap shape with the assembled disk, while still integral with the sheet 26, is advanced to the cap severing station 35 where the caps are severed from the sheet. This is preferably achieved by positioning a die member 51 around the outer side of the skirt, with the die member having an inner opening 51a dimensioned to closely surround the skirt to radially support and center the cap. A punch 52 is thereafter passed through the sheet from the other side thereof to sever the cap shape from the sheet along a line adjacent the juncture of the skirt with the sheet. Preferably, the punch has an annular cutting edge 52a dimensioned to be closely received in the die opening 51a, and a support member 54 which projects from the cutting edge 52a, and which support member has an annular outer wall 54a that is dimensioned smaller than the die opening by an amount approximately equal to the thickness of the skirt, so that the support member engages the inner wall of the skirt to spread the skirt outwardly in the event it is deformed.

A preferred apparatus for practicing the method is shown in the accompanying drawings. The apparatus includes a main support frame having longitudinally extending upper rails 61 supported at spaced points therealong on posts 62, with lower frame members 63 extending between the posts to provide a brace and support structure therefor. The sheet of thermo-plastic material 26, conveniently disposed in a roll 65 at one end of the frame, is entrained over an idler roll 66 and is advanced longitudinally over the rails past the successive stages by a conveyor mechanism 67. In the embodiment herein illustrated, the conveyor mechanism is in the form of upper and lower endless chains 68 and 69 entrained over sprockets 71, 72 and 73, 74 adjacent opposite ends of the rails (see FIG. 1). The chains have their adjacent runs disposed closely together to grip the edge portions of the sheet therebetween and advance the sheet with the chains, and idler sprockets 75 are disposed at spaced points along the length of the chains to hold the adjacent runs thereof in gripping engagement with the edge portions of the thermoplastic sheet.

The conveyor is arranged to advance the sheet in step fashion past the successive stations and any suitable drive means may be provided for the conveyor. In the embodiment illustrated, the drive means is pnuematically operated and includes a cylinder 81 having a piston therein connected to a rack 82. The rack 82 meshes with a gear 83 which is mounted for rotation relative to a shaft 84 extending crosswise on the frame adjacent one end. The gear 83 is connected through a one-way clutch mechanism 86 (FIG. 2), of any conventional construction, to the shaft 84 to turn the shaft with the gear 83, when the latter is rotated in one direction, that is counter-clockwise as shown in FIG. 1. The one-way clutch allows the gear to turn relative to the shaft 84 when the gear is rotated in the other or clockwise direction. Thus, as the rack 82 is moved downwardly, it rotates the shaft 84 through an angle corresponding to the stroke of the rack to advance the conveyors and the thermo-plastic sheet a preselected distance. An adjustable stop 87 is provided for controlling the stroke of the rack to thereby control advance of the sheet of thermo-plastic material. As shown in FIGS. 1 and 2, the shaft 84 is connected through sprockets 88, chains 89 and sprockets 90 to the conveyor shaft 72a to drive the upper conveyor and the lower conveyor moves with the upper conveyor.

The heaters 31 and 32 may be of any conventional construction and, as shown in FIG. 1, are mounted on brackets 91 and 92 to lie on opposite sides of the sheet of material to heat the same. The heaters are preferably vertically adjustable relative to the sheet, to control the heating action and a means such as a suitable thermostat may be provided for regulating the temperature of the heating unit. The temperature at which the heating unit is maintained will of course vary with the speed at which the sheet material is advanced past the heaters, the temperature, length of heating units and speed of advance of the sheet being adjusted so that the thermo-plastic material will be heated to a temperature above its softening temperature to enable subsequent forming of the same. Heat shields 94 are preferably provided alongside the conveyor chains in the region adjacent the heaters to minimize the heating of the chains.

The cap forming apparatus is advantageously arranged to form a plurality of cap shapes in the sheet with the cap shapes arranged in a row extending crosswise of the sheet. The cap forming die includes a base plate 101 supported on a header 102 which extends crosswise of the machine. The header is mounted adjacent opposite ends thereof by brackets 103 on piston rods 104 associated with fluid operators 105. The fluid operators are rigidly mounted on a cross piece 106 and support the headers for a movement toward and away from the underside of the sheet of material. The cap forming die members 41 are in the form of rings mounted on the base plate 101 at spaced points therealong and the die members are formed with inner, top and outer wall surfaces designated 11a, 12a, and 13a shaped complementary to the respective sealing wall 11, rim 12 and skirt 13 of the cap. As described in connection with the cap, the inner wall 11a tapers upwardly and inwardly to form a reverse taper on the sealing wall of the cap.

The heat softened sheet 26 of thermo-plastic material may be pressed into conformity with the mold form either by evacuating the underside of the sheet to allow ambient air pressure to press the sheet into conformity with the mold, or by applying fluid pressure to the upper side of the sheet, while venting the area at the underside to atmosphere, or by both fluid pressure on one side and vacuum at the other side of the sheet. In the embodiment illustrated, the area of the underside of the sheet is vented to atmosphere and for this purpose vent passages indicated at 108a are formed in the base plate 101 and vent grooves 108b and 108c are formed in the die members to communicate with the vent passages 108a and thereby vent the area inside the ring and also outside the ring at spaced points therearound through passages 109 in the header, to atmosphere. It is apparent, these passages could also be connected to a source of vacuum, if desired. Fluid pressure is applied to the upper side of the sheet by a pressure chest indicated at 113 having a chamber 114 at the underside thereof and a marginal rim portion 115 which cooperates with the base plate 101 to clamp the sheet 26 therebetween. The chest is supported by brackets 118 on piston rods 119 associated with fluid actuators 121. These actuators are supported on an upper cross member 122 and, conveniently, the upper and lower cross members 122 and 106 are interconnected by members 123. Fluid pressure is applied to the pressure chest, when the latter is in clamping engagement with the sheet, through a passage 128 that communicates with the chamber 114. The baffle 129 is preferably provided in the chamber for distributing the air pressure therealong and to prevent localized cooling of areas of the sheet, due to impingement of the incoming air thereon.

A stripper is provided for stripping the cap forms off the mold dies 41. As shown, the stripper comprises a generally open frame structure including spaced side members 131 and end members 132 disposed around the header 102 and base plate 101. The strippers are movable vertically relative to the header 102 and, as shown in FIG. 8, fluid actuators 134 are mounted by brackets 135 on the header 102 and have pistons 136 connected to brackets 137 on the stripper to shift the stripper axially relative to the header 102. The actuators 134 are preferably of the single acting type which are yieldably urged to the retracted position shown in FIG. 8, and which are extended to raise the strippers when fluid pressure is applied to the actuators. The strippers are preferably actuated to raise the strippers for stripping the caps off the dies, as the dies are retracted, in the manner described more fully hereinafter. The cap shapes while still integral with the sheet and before they have cooled are advanced to the disk inserting station 34.

The cap forms in the sheet are supported during disk insertion by the aforedescribed support member 45 and ring members 46 which underlie the cap and which engage the inner side of the skirt of the cap to radially center the same. In the multiple cap making machine of the present invention, a plurality of ring members 46 are mounted at spaced locations on the support member 45 to simultaneously engage and support each of the cap members in a row extending crosswise of the sheet. As best shown in FIG. 7 the support member 45 is mounted for movement toward and away from the sheet by spaced guide rods 142 which are slidably supported in bearings 143 on a cross member 144. A fluid actuator 145 is mounted on the cross member and has a piston 146 connected to the support member 45 to raise and lower the latter.

The disk inserters include a means 151 for dispensing disks and means 152 for pressing the dispensed disks into the annular sealing wall of the cap. The apparatus is arranged so that disks are inserted in each of the cap forms in a row crosswise of the sheet and, while various different forms of disk dispensers may be provided, the several dispensers and plungers may conveniently be mounted on a common header 154 which extends crosswise of the machine and is supported at its opposite ends on the longitudinal rail 61 (see FIG. 7). The header has a plurality of vertically disposed openings 157 therein for receiving tubes 158 that form a magazine for the stack of disks. The headers also has a second set of openings or bores 159 therein associated with the respective one of the magazines, and for receiving a plunger 161. A plate 162 is secured to the underside of the header 154 and guideways 163 are formed at the interface between the plate and the header to receive slides 164. The slides 164 have an opening 165 therein for receiving a disk and are movable between a position shown in FIG. 4 in alignment with the magazine, and a second position as shown in FIGS. 5 and 6 in alignment with the plunger 161. The plate 162 has an opening 168 in alignment with the plunger bore 159 of the header, and the upper end of the opening is preferably chamfered as shown to guide the cap during movement by the plunger 161.

The several plungers 161 are actuated in unison and, for this purpose, are connected to a common cross member 171 which is supported by guide rods 172 (FIG. 7) in bearings 173 connected to an upper cross member 174, for movement toward and away from the upper side of the sheet. A fluid actuator 175 is also supported on the cross member 174 and has its piston 176 connected to the cross member 171 to raise and lower the latter. The disk feeding slides 164 may be operated in unison, but are preferably provided with individual actuators including cylinders 178 attached to the header 154 and piston rods 179 connected to the individual slides 164. With this arrangement, if a disk becomes jammed in any one of the feed mechanisms, it will not interfere with the feeding of the other disks.

The cap shapes with the disks inserted are advanced while still integral with the sheet to the cap severing station 35 wherein the caps are severed from the sheet and stacked. The sheet 26 is supported at the cap servering station on a cross member 191 which is secured adjacent opposite ends to the side rails 61, and which has a plurality of openings 192 therein for guidably receiving the punches 52. The several die members are preferably formed in a continuous strip as best shown in FIG. 3 with the die openings 51a at spaced locations therealong, and the die members are supported on a vertically movable frame structure including members 194, cross member 195 overlying the upper side of the sheet, vertically extending guide members 196 and a lower cross member 197 which underlies the underside of the sheet. The aforedescribed frame structure is raised and lowered by fluid actuators 198. The actuators 198 are mounted on the main frame structure and have their piston rods 199 connected to the vertically movable frame structure to raise and lower the die members into and out of position around the cap shapes in the sheet. As previously described, the die openings 51a are dimensioned to closely surround the skirt portions 13 of the caps to radially center and locate the same and, as best shown in FIGS. 4–6, cap guide tubes 201 are mounted on the upper cross member 195 and have an inner diameter slightly larger than the die openings 51a to provide a shoulder therebetween which engages and supports the underside of the caps, after they have been pressed through the die opening. As shown in FIG. 6, the die member, when lowered, clamps the sheet to the support 191.

A plurality of the punch members 52, corresponding in number to the number of caps in a row crosswise of the sheet, are mounted on a common header 211 for movement toward and away from the underside of the sheet. The header, as shown in FIG. 3, is slidably supported by bearing assembly 212 on the upright frame members 196, for movement relative to the frame, and a fluid operator 213 is mounted on the lower frame section 197 and has its piston rod 214 connected to the header 211, to move the latter relative to the frame. With the above arrangement, the fluid operators 198 are operative to lower the die member 51 into position around the skirt portion of the cap, to clamp the sheet against the support 191, and the fluid operator 213 is operative to thereafter move the punches 52 upwardly through the sheet and die members to punch the caps from the sheet. As previously described, the annular wall 54a on the projecting portion 54 of the punch members, engages the inner side of the cap skirt to expand the same, in the event the skirt has shrunk or deformed, to thereby assure severing of the cap from the sheet along a line at the juncture therebetween. After the caps are pressed upwardly through a die openings 51a, they are supported against downward movement on the shoulder between the die member and the cap guide tubes 201.

Any suitable means may be provided for operating the several instrumentalities in timed relation to each other and with the advance of the sheet, and detailed description thereof is deemed unnecessary. The sequence control may, for example, comprise a plurality of valves individual to each of the fluid operators or to pairs of fluid operators which are operated in unison, and a cam mechanism for sequentially operating the several valves. As diagrammatically shown in FIG. 1, a sequence control mechanism designated generally by the numeral 250 is connected through conduits 251, 251' to opposite ends of the cylinders 121 for raising and lowering the pressure chest 113, and the control is connected through lines 252, 252' to opposite ends of the cylinders 105 for raising and lowering the cap forming die 41. As previously described, the stripper 131 is operated by a single acting cylinder which is conveniently connected to one of the lines 252, so as to extend or raise the stripper when the forming die 41 is retracted. The sequence control is also connected through lines 253, 253' to the cylinder 145 for raising and lowering the cap support at the disk inserting station, and is further connected through lines 254, 254' to the cylinder 175 for actuating the disk inserting plungers 161. The sequence control is connected through lines 255, 255' to the several cylinders for operating the disk feed slides, and is further connected through lines 256, 256' and 257, 257' to the punch and die operating cylinders 213 and 198 respectively. The conveyor cylinder 81 is connected to the sequence controls through lines 259, 259'. The sequence control 250 is arranged to sequentially apply and exhaust fluid from the several lines and the operators connected thereto so as to advance the conveyor in step fashion. After the conveyor has advanced the sheet a preselected distance, fluid pressure is applied to the cylinder 105 and 121 to bring the forming die and pressure chest into engagement with opposite sides of the sheet, and pressure is applied through line 270 to the pressure chest to form a cap at the station 33. Preferably, fluid is also simultaneously applied to the fluid operators 145, 178 and 198 to move the cap locaters into position at the disk inserting station; to feed a disk into position below the disk inserting plungers and to also move the punch dies 51 down into position around the caps at the cap severing station 35.

Fluid pressure is thereafter applied to the fluid operators 175 and 213 to press a disk into the cap at the disk inserting station and to punch the assembled cap from the sheet at the cap severing station. The sequence control then operates to retract the several instrumentalities and, for this purpose, applies fluid pressure to the operators 105 and 121 to retract the disk forming die and the pressure chest at the cap forming station while raising the strippers to strip the cap off the die during retraction of the same. In addition, fluid pressure is applied to the operators 175 and 145 to retract the disk inserting plungers and the cap supports at the disk inserting station. In addition, the fluid pressure on the cylinders 121 and 198 is reversed by the sequence control to retract the die and punch away from the sheet at the cap severing station. The disk feed cylinders 178 are operated to retract the slides 164, after the plungers 161 have been raised.

It should be understood that various changes, modifications and alterations may be made in a detail of the apparatus without departing from the spirit and scope of the invention as defined in the appended claims.

I claim:

1. The method of forming composite plastic and fiber caps comprising: pressure forming a heat softened sheet of thermo-plastic material over a mold die to form a cap shape having a mouth-spanning portion; an upwardly and inwardly inclined annular sealing wall around the mouth-spanning portion with a major internal diameter adjacent the mouth-spanning portion and a minor internal diameter adjacent the upper end; an outwardly extending rim on the upper end of the sealing wall; and a depending skirt on the outer edge of the rim having its lower end integrally joined to the sheet at a level adjacent the level of the mouth-spanning portion, disengaging the mold die from the cap shape and pressing an accurately sized diametrically stiff disk of fiber stock having an outer diameter approximately equal to the major internal diameter of the sealing wall into the annular sealing wall before the sheet is cooled and while the cap shape remains attached to the sheet, and thereafter severing the cap shape from the sheet adjacent the juncture of the skirt with the sheet.

2. The method of claim 1 wherein the pressing of the disk into the cap shape includes the steps of radially supporting the cap shape during insertion of the disk by engagement with the inner side of the outer skirt while maintaining the sealing wall substantially radially unsupported adjacent the minor diameter thereof.

3. An apparatus for forming and assembling caps having a mouth-spanning portion, an upwardly and inwardly inclined annual sealing wall around the mouth-spanning portion with a major internal diameter adjacent the mouth-spanning portion and a minor internal diameter adjacent its upper end, an outwardly extending rim on the upper end of the sealing wall, and a depending skirt on the outer edge of the sealing wall, with a disk insert in the sealing wall, said apparatus comprising means for providing a sheet of heat softened thermoplastic material, means for advancing the sheet of heat softened thermo-plastic material in step fashion past successive cap forming; disk inserting; and cap severing stations, a mold form at the forming station having a shape complementary to one side of the cap to be formed, means at the forming station for producing a fluid pressure differential on opposite sides of the sheet to press the heat softened sheet into conformity with the mold form to produce a cap form which projects laterally from one side of the sheet with the lower end of the depending skirt integral with the sheet and for thereafter relatively moving the mold form and sheet to disengage the mold form from the cap form in the sheet, means at the disk inserting station for pressing a diametrically stiff disk having an outer diameter approximating the major inner diameter of the sealing wall into the annular sealing wall on the cap form at said one side of the sheet, and means at the cap severing station for severing a cap form with the assembled disk from the sheet along a line adjacent the juncture of the skirt with the sheet.

4. An apparatus according to claim 3 wherein said disk inserting means includes an annular member at the other side of the sheet having an outer diameter approximately equal to the inner diameter of the cap skirt, and a plunger at said one side of the sheet concentric with the annular member and dimensioned smaller than the inner diameter of the cap sealing wall, means for moving said annular member into and out of a position engaging the inside of the skirt to radially support and center the same, and means for moving the plunger into a position inside the annular sealing wall to press the disk therein while the annular member is in engagement with the skirt.

5. An apparatus for forming composite plastic and fiber caps comprising:
(a) means for providing a sheet of heat softened thermoplastic material,
(b) means for forming a cap form in the sheet having a mouth-spanning portion, an upwardly and inwardly inclined annular sealing wall with a major internal diameter adjacent the mouth-spanning portion of the cap form and a minor internal diameter adjacent the upper end of the sealing wall; an outwardly extending rim on the upper end of the sealing wall; and a depending skirt on the outer edge of the rim; said cap forming means including:

(1) a mold die having a shape complementary to one side of the cap form to be formed;

(2) means for producing a pressure differential on opposite sides of the sheet to press the heat softened sheet into conformity with the mold die to produce a cap form with the lower edge of the skirt on the cap form integral with the sheet at a level adjacent the level of the mouth-spanning portion;

(3) and means for relatively moving the mold die and sheet to disengage the mold die from the cap form in the sheet;

(c) means for pressing an accurately sized diametrically stiff disk having an outer diameter approximately equal to the major inner diameter of the sealing wall into the annular sealing wall while the cap form remains integral with the sheet, (d) means for severing the cap forms with the assembled disk from the sheet along a line adjacent the juncture of the skirt with the sheet, (e) and operating means for relatively moving the sheet and the cap forming means, disk pressing means and cap severing means to sequentially form a cap form in the sheet; press a disk into the annular sealing wall of the cap form, and sever the cap form from the sheet.

References Cited

UNITED STATES PATENTS

| | | |
|---|---|---|
| 1,486,937 | 3/1924 | Taliaferro. |
| 1,647,379 | 1/1927 | Swift. |
| 1,899,783 | 2/1933 | Warth. |
| 2,141,833 | 12/1938 | Young. |
| 2,218,540 | 10/1940 | Kronquest. |
| 2,223,321 | 11/1940 | Kempe. |
| 2,230,189 | 1/1941 | Ferngren. |
| 2,719,564 | 10/1955 | Schneider. |

WILLIAM J. STEPHENSON, *Primary Examiner.*

U.S. Cl. X.R.

18—19; 29—33, 563; 93—1.3; 113—80; 264—241